US012654647B2

(12) United States Patent
An et al.

(10) Patent No.: US 12,654,647 B2
(45) Date of Patent: Jun. 16, 2026

(54) METHOD FOR MANUFACTURING CRASH PAD OF VEHICLE

(71) Applicants: Hyundai Motor Company, Seoul (KR); Kia Corporation, Seoul (KR); BSP INC., Anyang-si (KR)

(72) Inventors: Jae Hyun An, Hwaseong-si (KR); In Soo Han, Hwaseong-si (KR); Hong Jin Park, Anyang-si (KR); Ki Chul Choi, Seoul (KR); Jai Hyoun Kim, Anyang-si (KR)

(73) Assignees: Hyundai Motor Company, Seoul (KR); Kia Corporation, Seoul (KR); BSP Inc., Anyang-si (KR)

( * ) Notice: Subject to any disclaimer, the term of this patent is extended or adjusted under 35 U.S.C. 154(b) by 0 days.

(21) Appl. No.: 19/067,055

(22) Filed: Feb. 28, 2025

(65) Prior Publication Data

US 2026/0116333 A1      Apr. 30, 2026

(30) Foreign Application Priority Data

Oct. 30, 2024      (KR) ........................ 10-2024-0151117

(51) Int. Cl.
*B60R 21/2165*        (2011.01)
*B23K 26/03*          (2006.01)
          (Continued)

(52) U.S. Cl.
CPC .......... *B60R 21/235* (2013.01); *B23K 26/032* (2013.01); *B23K 26/0626* (2013.01);
          (Continued)

(58) Field of Classification Search
CPC . B60R 21/215; B60R 21/235; B60R 21/2165; B60R 21/205; B60R 21/045;
          (Continued)

(56) References Cited

U.S. PATENT DOCUMENTS 5,744,776 A  *  4/1998  Bauer ................. B23K 26/123
                                                        219/121.7
5,882,572 A  *  3/1999  Lutze ................... B23K 26/032
                                                        264/156
          (Continued)

FOREIGN PATENT DOCUMENTS

CN        115946419 A  *  4/2023
DE        19654452 A1 *  1/1998   ......... B60R 21/2165
          (Continued)

*Primary Examiner* — Keith J Frisby
(74) *Attorney, Agent, or Firm* — Fish & Richardson P.C.

(57)      ABSTRACT

A method for manufacturing a vehicle crash pad includes heating a skin layer using a heater, attaching a cushion layer to the skin layer, placing a lower mold and an upper mold relative to a fabric including the skin layer and the cushion layer, forming a molded member on the lower mold, vacuum molding. The upper mold is lowered to perform the vacuum molding. The method further includes a laser processing of the fabric and molded member using a processing system, where a sensor senses the fabric and molded member, and based on sensed data, a through-hole is defined by adjusting the intensity of a laser's light irradiated to the fabric and molded member.

14 Claims, 8 Drawing Sheets

(51) Int. Cl.

| | |
|---|---|
| *B23K 26/062* | (2014.01) |
| *B23K 26/359* | (2014.01) |
| *B23K 26/364* | (2014.01) |
| *B23K 26/382* | (2014.01) |
| *B23K 26/402* | (2014.01) |
| *B23K 103/00* | (2006.01) |
| *B29C 45/14* | (2006.01) |
| *B29C 59/00* | (2006.01) |
| *B32B 3/26* | (2006.01) |
| *B32B 5/02* | (2006.01) |
| *B32B 27/12* | (2006.01) |
| *B60R 13/02* | (2006.01) |
| *B60R 21/205* | (2011.01) |
| *B60R 21/235* | (2006.01) |
| *B23K 101/00* | (2006.01) |
| *B23K 103/16* | (2006.01) |
| *B29L 31/30* | (2006.01) |

(52) U.S. Cl.

CPC .......... *B23K 26/359* (2015.10); *B23K 26/364* (2015.10); *B23K 26/382* (2015.10); *B23K 26/402* (2013.01); *B29C 45/14008* (2013.01); *B29C 59/007* (2013.01); *B32B 3/266* (2013.01); *B32B 5/022* (2013.01); *B32B 5/026* (2013.01); *B32B 27/12* (2013.01); *B60R 13/0256* (2013.01); *B60R 21/205* (2013.01); *B60R 21/2165* (2013.01); *B23K 2101/006* (2018.08); *B23K 2103/172* (2018.08); *B23K 2103/38* (2018.08); *B23K 2103/42* (2018.08); *B29C 2791/009* (2013.01); *B29C 2793/0045* (2013.01); *B29C 2793/0054* (2013.01); *B29L 2031/3008* (2013.01); *B29L 2031/3038* (2013.01); *B29L 2031/3055* (2013.01); *B32B 2250/02* (2013.01); *B32B 2605/003* (2013.01); *B60R 2021/23509* (2013.01); *B60R 2021/23557* (2013.01); *Y10T 83/0341* (2015.04); *Y10T 83/0348* (2015.04); *Y10T 83/0356* (2015.04)

(58) Field of Classification Search

CPC ...... B60R 21/2342; B60R 2021/23533; B60R 2021/23557; B60R 2021/23509; B60R 2021/21654; B60R 13/0256; B23K 26/032; B23K 26/03; B23K 26/0626; B23K 26/062; B23K 26/382; B23K 26/402; B23K 26/364; B23K 26/359; B23K 26/00; B23K 26/362; B23K 2103/38; B23K 2103/42; B23K 2103/172; B23K 2101/006; B23B 3/266; B23B 3/26; B23B 27/12; B23B 2250/00; B23B 2250/02; B23B 2250/03; B23B 2250/04; B23B 2250/05; B23B 2605/003; B32B 5/022; B32B 5/02; B32B 5/026; B32B 2605/00; B32B 2605/003; B32B 2605/09; B29C 59/007; B29C 2791/009; B29C 2035/0838; B29C 2793/0045; B29C 2793/0054; B29C 45/14; B29C 45/14008; B29L 2031/3008; B29L 2031/3038; B29L 2031/3005; B29L 2031/3055; Y10T 83/0333; Y10T 83/0341; Y10T 83/0348; Y10T 83/0356

USPC .......... 280/728.1, 728.3, 732; 264/400, 482, 264/409; 83/879, 880, 881, 882

See application file for complete search history.

(56) References Cited

U.S. PATENT DOCUMENTS

| | | | | |
|---|---|---|---|---|
| 5,883,356 | A * | 3/1999 | Bauer | B23K 26/0344 219/121.85 |
| 6,070,901 | A * | 6/2000 | Hazell | B60R 21/2165 280/732 |
| 6,337,461 | B1 * | 1/2002 | Yasuda | B23K 26/032 219/121.62 |
| 7,121,578 | B2 * | 10/2006 | Cowelchuk | B60R 21/2165 280/728.3 |
| 7,748,733 | B2 * | 7/2010 | Griebel | B60R 21/2165 280/728.3 |
| 7,938,437 | B2 * | 5/2011 | Lippert | B23C 3/30 219/121.85 |
| 8,967,659 | B2 * | 3/2015 | O'Gara | B29C 59/007 280/732 |
| 10,640,837 | B2 * | 5/2020 | Weissert | B60R 13/0256 |
| 11,440,140 | B2 * | 9/2022 | Drechsel | C14B 1/44 |
| 2001/0006168 | A1 * | 7/2001 | Okumura | B23K 26/382 219/121.7 |
| 2002/0190505 | A1 * | 12/2002 | Feistel | B23K 26/364 280/728.3 |
| 2003/0000927 | A1 * | 1/2003 | Kanaya | B23K 26/389 219/121.62 |
| 2003/0019848 | A1 * | 1/2003 | Nicholas | B23K 26/0342 219/121.76 |
| 2006/0138751 | A1 * | 6/2006 | Matsuno | B26D 5/02 264/138 |
| 2006/0226638 | A1 * | 10/2006 | Yasuda | B32B 5/18 428/43 |
| 2006/0231536 | A1 * | 10/2006 | Griebel | B23K 26/03 219/121.72 |
| 2008/0290075 | A1 * | 11/2008 | Wittenbecher | B23K 26/38 425/141 |
| 2009/0288542 | A1 * | 11/2009 | Matsuno | B29C 59/007 83/879 |
| 2012/0223512 | A1 * | 9/2012 | Barr | B60R 21/2165 280/743.1 |
| 2012/0315446 | A1 * | 12/2012 | Wisniewski | B32B 38/0004 252/582 |
| 2015/0352670 | A1 * | 12/2015 | Lutze | B23K 26/402 264/400 |
| 2016/0161246 | A1 * | 6/2016 | Chen | B60R 21/2165 348/46 |
| 2018/0133841 | A1 * | 5/2018 | Lutze | B23K 26/082 |

FOREIGN PATENT DOCUMENTS

| | | | | |
|---|---|---|---|---|
| DE | 102005054607 A1 * | 5/2007 | .......... | B23K 26/389 |
| DE | 102007013108 B3 * | 8/2008 | .......... | B23K 26/40 |
| JP | 2013095344 A * | 5/2013 | | |
| JP | 2017114238 A * | 6/2017 | | |
| JP | 6242551 B1 * | 12/2017 | | |
| KR | 20020043882 A * | 6/2002 | .......... | B60R 21/205 |
| KR | 10-2005-0076489 A | 7/2005 | | |
| KR | 20050076482 A * | 7/2005 | | |
| KR | 20070106178 A * | 11/2007 | ........ | G01N 33/0083 |
| WO | WO-2008104230 A1 * | 9/2008 | .......... | B23K 26/044 |
| WO | WO-2009141863 A1 * | 11/2009 | .......... | B60K 37/20 |

* cited by examiner

110

121

210

220

122

METHOD FOR MANUFACTURING CRASH PAD OF VEHICLE

CROSS-REFERENCE TO RELATED APPLICATION

This application claims, under 35 U.S.C. § 119 (a), the benefit of and priority to Korean Patent Application No. 10-2024-0151117, filed on Oct. 30, 2024, the entire contents of which are incorporated herein by reference.

TECHNICAL FIELD

The present disclosure relates to a method for manufacturing a crash pad of a vehicle. More particularly, the present disclosure relates to a method for processing a crash pad skin.

BACKGROUND

Automobiles may be equipped with various accessories for the safety of passengers. For instance, a steering wheel has mounted therein an air bag, which is a safety auxiliary accessory for automobiles to protect the driver from receiving severe impact in the event of a car accident.

As the performance of automobiles has improved and the condition of road pavement has improved, the traveling speed of automobiles has also increased, and as a result, the number of car accidents is increasing, resulting in increased human casualties.

A vehicle is equipped with passenger air bags (PABs) mounted in the steering wheel and passenger seat, and at two knees, four seats, and three side glass fixing pillars.

In some cases, where there is a passenger seat airbag for protecting the passenger sitting in the passenger seat, a crash pad may be placed in front of the passenger seat and provided with a soft airbag cover, made through plastic injection molding and integrated into one piece with the crash pad. The airbag is placed inside the cover, so that when the vehicle is impacted or stops suddenly, the airbag cover breaks and the airbag is deployed.

In some cases, the crash pad has an upper portion elongated leftward and rightward such that opposite ends thereof are coupled to left and right side members of the vehicle, respectively, and has a middle portion, which is commonly called a center fascia, extended downward to be elongated upward and downward, and coupled to a front floor, which is a bottom surface of a passenger cabin.

In some cases, crash pads may be foam-molded to provide an elastic cushion on their own, satisfying high durability against high temperatures and direct sunlight, formability due to heat molding, and high-temperature physical properties, and are a part that comes into direct contact with a driver and passenger, providing emotional stimulation and comfort.

The crash pad is classified into a soft type crash pad and a hard type crash pad. In some cases, the soft type crash pad may have three layers (skin, foam, and core) at a cross section thereof so as to provide a soft external appearance, soft tactile property, and soft cushioning property. The hard type crash pad has a single layer (core), and is a product manufactured by injection molding using plastic.

The soft type crash pad may be used because the soft type crash pad provides soft external appearance, soft tactile property, and soft cushioning property.

Particularly, in order to make the vehicle interior luxurious, emotionally stimulating, and comfortable, the crash pad skin may be manufactured to have the external surface attached to the crash pad.

The crash pad skin may be processed using the powder slush molding (PSM) and/or the vacuum molding method.

In some cases, high-power lasers may be used to process crash pad skins, where the skins may be carbonized due to high-power lasers, which deteriorated the appearance quality and caused a fire hazard. In some cases, the manufacturing process may become complicated because product processing was impossible or difficult depending on the molding state of the skin. In some cases, a robot arm may be used to measure the laser intensity, but the weight and speed were limited due to the payload limit of the robot arm.

SUMMARY

The present disclosure describes a method for processing a fabric in various ways in a product molding state at a high speed using a low-power laser, simplifying the process and shortening cycle time (C/T), thereby reducing costs and securing deployment performance of a passenger air bag (PAB).

The present disclosure further describes a method of placing a jig-mounted light receiving sensor, configured to measure laser intensity, and a method of sensing, by the jig-mounted light receiving sensor, the laser intensity without using a robot arm.

According to one aspect of the subject matter described in this application, a method for manufacturing a vehicle crash pad of an airbag includes heating a skin layer using a heater, attaching a cushion layer to the skin layer to thereby form a fabric including the skin layer and the cushion layer disposed below the skin layer, placing (i) a lower mold below the fabric and (ii) an upper mold above the fabric, at least one of the lower mold or the upper mold being configured to move up and down relative to the fabric, providing a molded member on the lower mold, the molded member being disposed below the cushion layer, performing a vacuum molding by moving the upper mold toward the lower mold, where the fabric and the molded member are disposed between the lower mold and the upper mold, and performing a laser processing with the fabric and the molded member that are coupled by the vacuum molding. The laser processing includes irradiating laser light to the fabric and the molded member to thereby define a through-hole through the fabric and the molded member, sensing, by a sensor, laser light passing through the through-hole, and adjusting an intensity of the laser light irradiated to the fabric and the molded member.

Implementations according to this aspect can include one or more of the following features. For example, the vehicle crash pad includes the skin layer, the cushion layer, and the molded member that are laminated in order. In some examples, the sensor is a single laser light receiving sensor, or one of a plurality of laser light receiving sensors. In some implementations, the laser processing may further include providing a spin lens that is configured to irradiate the laser light to the fabric and the molded member. In some examples, the laser processing may further include providing the laser light to the spin lens through a reflector, where the laser light is irradiated to the fabric and the molded member through the spin lens.

In some implementations, the laser processing may further include generating the laser light by a $CO_2$ low-power laser apparatus. In some examples, the skin layer may include an inner skin layer located inside the vehicle crash pad and an outer skin layer located outside the vehicle crash pad. For example, the inner skin layer of the skin layer may be made of any one material selected from thermoplastic olefin (TPO), polyurethane (PU), polyvinyl chloride (PVC), thermoplastic poly-urethane (TPU), polyethylene terephtha-late (PET), knitted fabric, and nonwoven fabric. In some examples, the outer skin layer may be made of any one material selected from thermoplastic olefin (TPO), polyure-thane (PU), polyvinyl chloride (PVC), thermoplastic poly-urethane (TPU), and polyethylene terephthalate (PET).

In some examples, the cushion layer may be made of any one material selected from polypropylene (PP) foam, ther-moplastic olefin (TPO) foam, polyurethane (PU) foam, knitted fabric, nonwoven fabric, and filament.

In some implementations, the through-hole may be a single through-hole or one of a plurality of through-holes, and may pass through an entirety of the molded member and the fabric that are coupled. In some examples, a diameter of a first portion of the through-hole through the fabric has a size of Φ0.1-Φ1.0, and a diameter of a second portion of the through-hole through the molded member is Φ0.6-Φ1.6.

In some examples, the laser processing may further include sensing a thickness of the fabric and the molded member that are coupled, transmitting sensed data to a controller, and adjusting, by the controller, (i) the intensity of the laser light, (ii) a duration of irradiation of the laser light, and (iii) an angle of a spin lens through which the laser light is irradiated. In some examples, the laser processing may further include holding the molded member and the fabric by a fixation jig, where the fixation jig is positioned adjacent to the sensor and configured to fix the molded member and the fabric to thereby define a position of the through-hole in the molded member and the fabric.

In some implementations, the laser processing may fur-ther include blowing air by an air blower toward the sensor. In some examples, the laser processing may further include moving the sensor up and down during the laser processing along a center line of the sensor.

According to another aspect, a vehicle crash pad of an airbag includes a fabric including a skin layer and a cushion layer attached to the skin layer, and a molded member attached to the fabric, where the molded member, the cushion layer, and the skin layer are laminated in order. The vehicle crash pad has a through-hole that is defined through the fabric and the molded member by adjusting an intensity of laser light irradiated to the fabric and the molded member.

Implementations according to this aspect can include one or more of the following features or the features described above. For example, the through-hole may be a single through-hole or one of a plurality of through-holes and may pass through an entirety of the molded member and the fabric that are coupled. In some examples, a diameter of a first portion of the through-hole through the fabric may be Φ0.1-Φ1.0, and a diameter of a second portion of the through-hole through the molded member may be Φ0.6-Φ1.6.

It is to be understood that the term "vehicle" or "vehicu-lar" or other similar terms as used herein are inclusive of motor vehicles in general, such as passenger automobiles including sport utility vehicles (SUVs), buses, trucks, vari-ous commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petro-leum). As referred to herein, a hybrid vehicle is a vehicle that has two or more sources of power, for example, a vehicle powered by both gasoline and electricity.

The above and other features of the present disclosure are discussed infra.

BRIEF DESCRIPTION OF THE DRAWINGS

The above and other features of the present disclosure will now be described in detail with reference to certain imple-mentations thereof illustrated in the accompanying drawings which are given herein below by way of illustration only, and thus are not limitative of the present disclosure.

DETAILED DESCRIPTION

Figure 1:
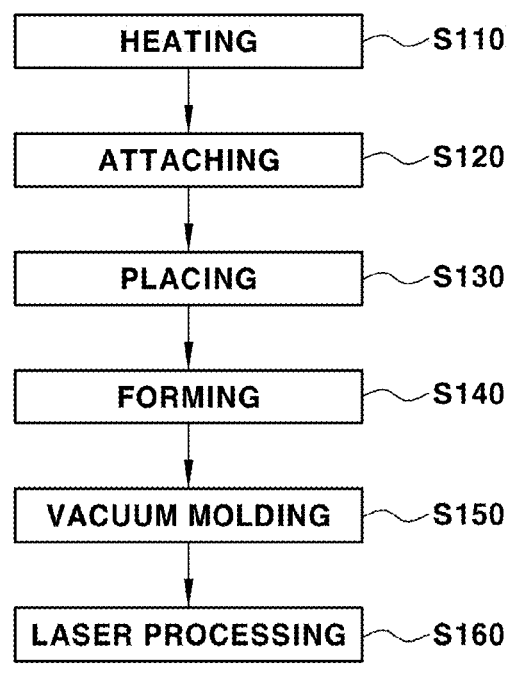
FIG. 1 is a flowchart of an example of a method for manufacturing a vehicle crash pad.

Hereinafter, various exemplary implementations of the present disclosure are described in detail with reference to the accompanying drawings. The exemplary implementa-tions of the present disclosure may be modified into various forms, and the scope of the present disclosure should not be construed as being limited to the following implementations. The exemplary implementations are provided to more com-pletely explain the present disclosure to those skilled in the art.

Hereinafter, one or more implementations will be described in detail with reference to the accompanying drawings, and in the description provided with reference to the accompanying drawings, the same or corresponding components are assigned the same reference numerals, and a description thereof will not be repeated.

Figure 2A:
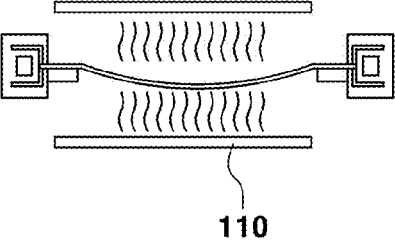
FIG. 2A to FIG. 2E are views illustrating an example of the method for manufacturing the vehicle crash pad.
Figure 2B:
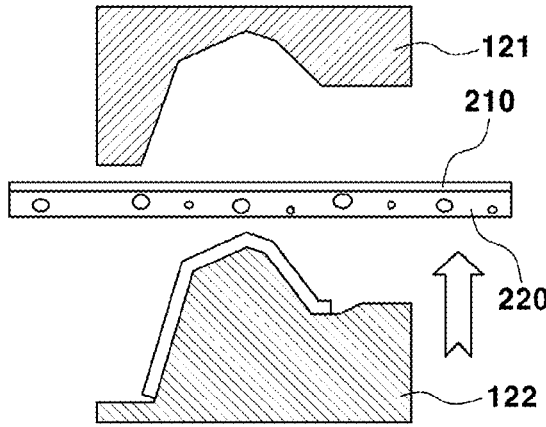
Figure 2C:
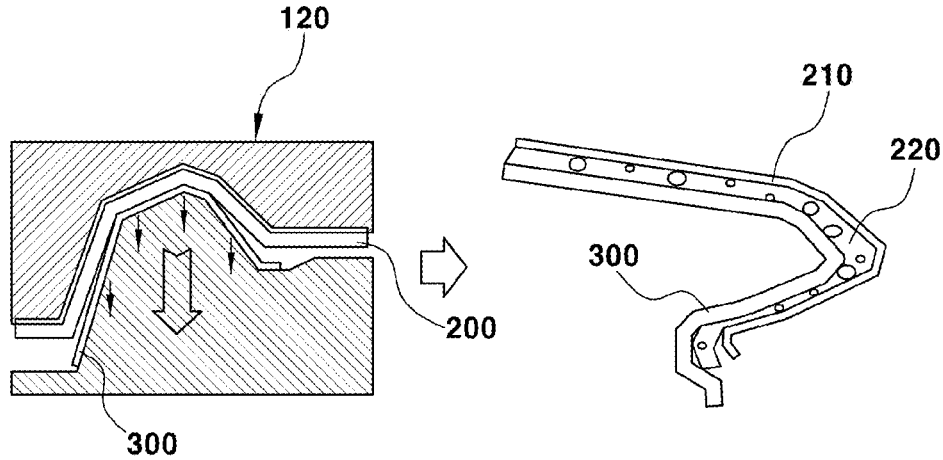
Figure 2D:
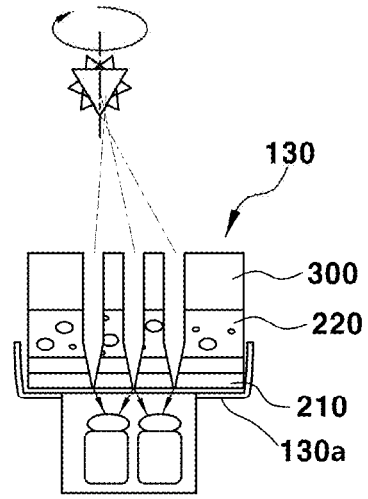
Figure 2E:
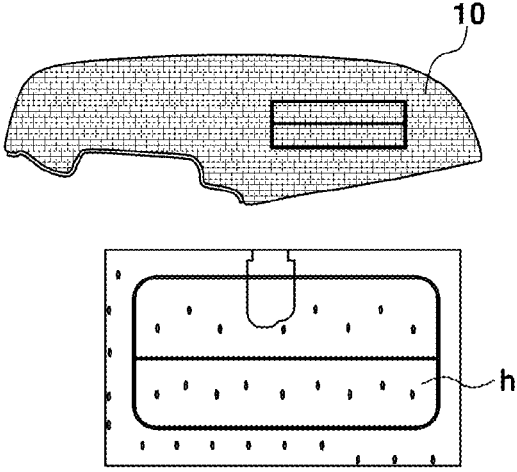
Figure 3:
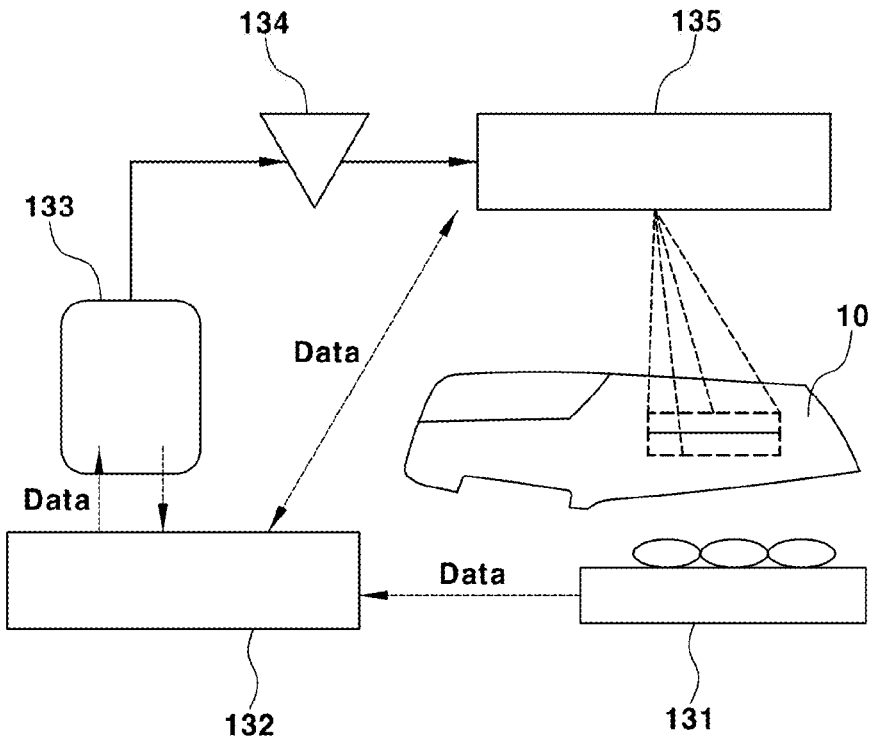
FIG. 3 is a view illustrating an example operation sequence of a processing system configured to manufacture the vehicle crash pad.
Figure 4:
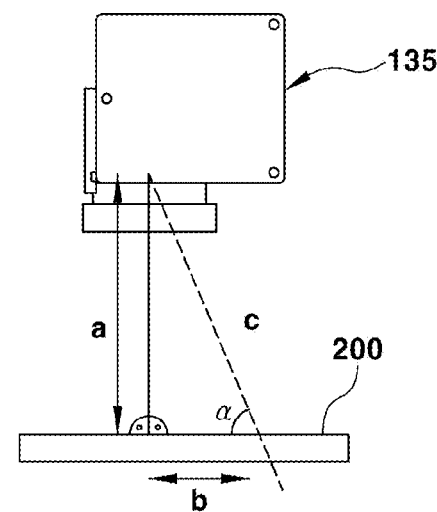
FIG. 4 is a view illustrating a spin lens of a processing system for manufacturing the vehicle crash pad.
Figure 5:
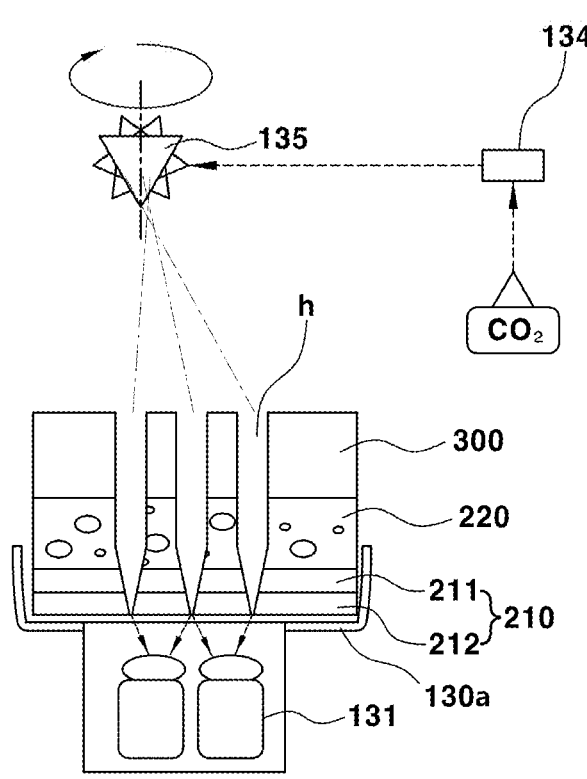
FIG. 5 is a view schematically illustrating how a fabric is processed by a processing system configured to manufacture the vehicle crash pad.
Figure 6:
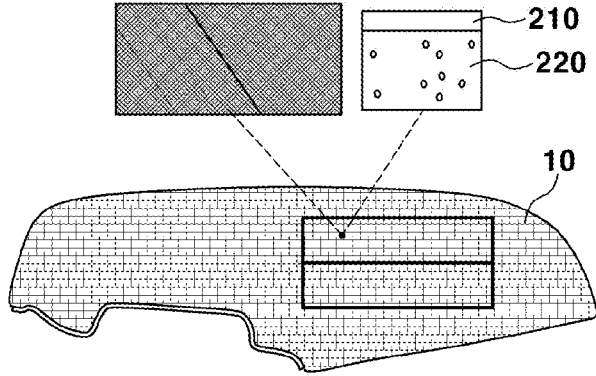
FIG. 6 is a view illustrating an example of a vehicle crash pad.
Figure 7:
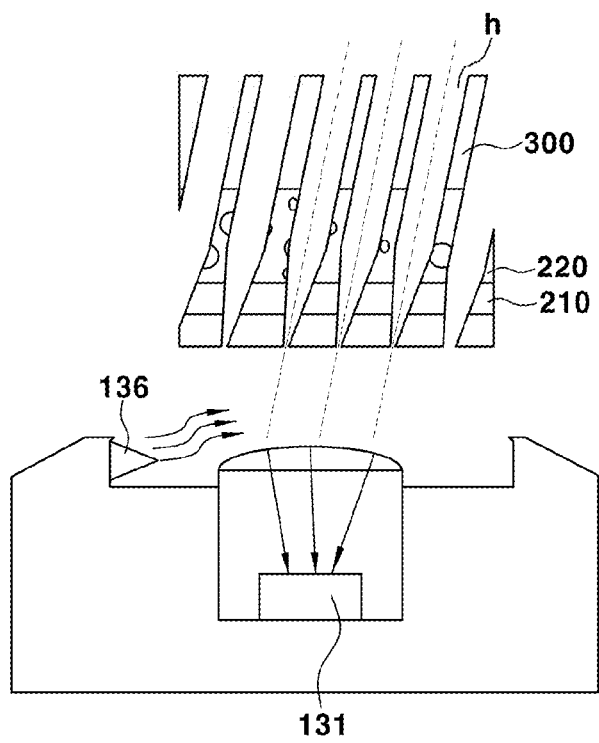
FIG. 7 is a view illustrating an example of through-holes formed in the fabric and the molded member using a processing system.

FIG. 1 is a flowchart of a method for manufacturing a vehicle crash pad according to the present disclosure, FIG. 2A to FIG. 2E are views illustrating a method for manufac-turing a vehicle crash pad according to the present disclo-sure, FIG. 3 is a view illustrating an operation sequence of a processing system configured to manufacture a vehicle crash pad of the present disclosure, FIG. 4 is a view illustrating a spin lens of a processing system for a vehicle crash pad of the present disclosure, FIG. 5 is a view schematically illustrating how a fabric is processed by a processing system configured to manufacture a vehicle crash pad of the present disclosure, FIG. 6 is a view illustrating a vehicle crash pad of the present disclosure, FIG. 7 is a view illustrating through-holes formed in a fabric and a molded member using a processing system of the present disclosure, and FIG. 8A to FIG. 8D are views illustrating examples of through-holes formed in a fabric and a molded member using a processing system of the present disclosure.

An example of a method for manufacturing a vehicle crash pad will be described by referring to FIGS. 1 to 6. In some implementations, the method for manufacturing the vehicle crash pad is largely divided into, as shown in FIG. 1, heating S110, attaching S120, placing S130, forming S140, vacuum molding S150, and laser processing S160.

Before describing the present disclosure, it should be noted that the present disclosure corresponds to a method of forming a workpiece for an automobile interior material shape, which is formed by electroplating using nickel plating in a manufacturing process of an automobile interior material manufactured, for example, by an in-mold graining (IMG) vacuum molding method.

Regarding the term "wrapping" used in the description of the present disclosure, the dictionary definition thereof is a packaging material or packaging, but in the automotive field, "wrapping" refers to attaching a sticker or protective film to the surface of a car. It should be noted that the term "wrapping" used in the present disclosure refers to "enclosing and laminating," as used in the mold manufacturing industry.

In some implementations, an inner skin layer 211 of a skin layer 210 of the present disclosure may be made of any one material selected from thermoplastic olefin (TPO), polyurethane (PU), polyvinyl chloride (PVC), thermoplastic polyurethane (TPU), polyethylene terephthalate (PET), knitted fabric, and nonwoven fabric. An outer skin layer 212 of the skin layer 210 may be made of any one material selected from thermoplastic olefin (TPO), polyurethane (PU), polyvinyl chloride (PVC), thermoplastic polyurethane (TPU), and polyethylene terephthalate (PET).

Moreover, a cushion layer 220 of the present disclosure may be made of any one material selected from polypropylene (PP) foam, thermoplastic olefin (TPO) foam, polyurethane (PU) foam, knitted fabric, nonwoven fabric, and filament.

In some examples, a crash pad 10 may have an upper portion elongated leftward and rightward such that opposite ends thereof are coupled to left and right side members of the vehicle, respectively, and may have a middle portion, which is commonly called a center fascia, extended downward to be elongated upward and downward, and coupled to a front floor, which is a bottom surface of a passenger cabin. Moreover, the crash pad 10 is provided with an airbag cushion and has an airbag door so that the airbag cushion is deployed toward the passenger. The airbag door is broken and opened when the airbag cushion is deployed.

In some implementations, a fabric 200 attached to the crash pad 10 can form a score. Therefore, in the present disclosure, a score can be formed on a molded member 300 and the fabric 200, which constitute the crash pad 10.

The airbag door of the present disclosure is placed to face the crash pad 10 and a passenger seat so as to protect the passenger in the passenger seat. Moreover, for cushioning and beauty of the exterior of the airbag door, the molded member 300 is attached to the airbag door. The crash pad 10 is provided with the airbag door, configured to protect the airbag cushion before an accident and configured to break to deploy the airbag cushion after an accident to protect the passenger.

In some implementations, the molded member 300 is attached to the fabric 200 so that when the airbag door is broken, the molded member 300 is also broken and opened. Because a surface of the molded member 300 attached to the crash pad 10, i.e., a bonding surface, has formed therein a score, when the airbag cushion is deployed, the crash pad 10 is broken and the molded member 300 is also broken and opened toward the passenger. The molded member 300 may become thinner toward the score. Moreover, the outer surface of the molded member 300 may be flat.

Because the score is formed horizontally in the bonding surface of the molded member 300, when the airbag cushion is deployed, the bonding surface of the molded member 300 is broken along the score and the airbag cushion is fully deployed toward the passenger.

In some implementations, the method for manufacturing the crash pad 10 includes the heating operation S110 in which the skin layer 210 is first heated using a heater 110, as illustrated in FIG. 2A.

After the heating operation S110, the attaching operation S120 is performed, where the cushion layer 220 is attached to the skin layer 210 to fabricate the fabric 200.

After the attaching operation S120, the placing operation S130 is performed, as illustrated in FIG. 2B, where a lower mold 122 is placed under an upper mold 121, configured to move up and down, in a corresponding manner. For example, the lower mold 122 is raised to come into contact with the fabric 200, and as the upper mold 121 and the lower mold 122 move vertically, the fabric 200 is placed between the upper mold 121 and the lower mold 122.

In addition, as illustrated in FIG. 2C, the forming operation S140 can be performed such that a molded member 300 is disposed on the lower mold 122. When the upper mold 121 and the lower mold 122 move vertically and press each other, the molded member 300 may also be pressed together with the fabric 200. In the vacuum molding operation S150, (e.g., IMG molding) in the present disclosure, the temperature of a mold set 120, which includes the upper mold 121 and the lower mold 122, may be set to 60° C., for instance. In some examples, the temperature of a heater may be set to 300 to 450° C. to preheat the skin layer 210 and the cushion layer 220. In some examples, the heating time may be set to 25 to 45 seconds, the forming time may be set to a total of 15 to 37 seconds, and the vacuuming time may be set to 8 to 21 seconds. The temperature of the fabric 200 may be set to 150 to 190° C. to prevent stretching of the end of the fabric 200, preventing stretching of the pattern thereof.

The above set conditions are based on test data, and the above data can be used to couple the fabric 200 and the molded member 300.

Through the above-described process, the fabric 200 and the molded member 300 are integrated into one piece. The method can further include a laser processing S160, where a processing system 130 may form a through-hole h in the fabric 200 and the molded member 300 using a laser or laser apparatus 133.

Specifically, the processing system 130 is configured to implement the crash pad 10 having formed therein the through-hole h, wherein the processing system 130 includes a sensor 131, a controller 132, the laser 133, a reflector 134, a spin lens 135, and an air blower 136.

The sensor 131 of the processing system 130 measures the thickness of the fabric 200 and the molded member 300 integrated into one piece. Depending on the implementation, the sensor 131 may be provided as one or more and may be positioned adjacent to the skin. Moreover, the sensor 131 of the present disclosure may be a light receiving sensor.

Furthermore, a center line of the sensor 131 for laser processing may move up and down, whereby, when the position for laser processing changes depending on vehicle models such that whether the driver seat is on the right or left side of the vehicle, the same equipment may perform sensing, thereby optimizing the cost of manufacturing a jig and sensor.

The controller 132 receives sensed data and adjusts the intensity of irradiation of the laser 133's light, which is irradiated to the fabric 200 and molded member 300, according to a targeted material. In some implementations, even in the case of a multi-layer fabric 200 in which different materials are bonded, the irradiation intensity of the laser 133 may be adjusted for each layer using the same equipment. For example, the controller 132 can include an electric circuit, a microprocessor, a processor, a computer, a signal receiver, a signal transmitter, a signal transceiver, etc.

The laser 133 of the present disclosure is configured to form the through-hole h in the fabric 200 and molded member 300. The laser 133 of the present disclosure may be a low-power $CO_2$ laser 133. The through-hole h is formed in the fabric 200 and molded member 300 using the low-power $CO_2$ laser 133 of the present disclosure, fundamentally solving the problem of carbonization of the fabric and the problem of deterioration of the external appearance that occurred when using a high-power laser.

The reflector 134 of the processing system 130 may be an optical lens. The reflector 134 transmits therethrough the light of the low-power laser 133, and delivers the light of the low-power laser 133 to the spin lens 135.

As illustrated in FIG. 2D, the spin lens 135 of the processing system 130 rotates at a high speed and delivers the light of the laser 133 received from the reflector 134 to the fabric 200 and the molded member 300. As illustrated in FIG. 2E, the light is delivered to the fabric 200 and the molded member 300 through the spin lens 135 to form the through-hole h in the fabric 200 and the molded member 300.

The air blower 136 of the processing system 130 is positioned adjacent to the sensor 131 and circulates air to the fabric 200 and the molded member 300 to prevent carbonization that may occur in the fabric 200 and the molded member 300 due to the light of the laser 133. Moreover, the air blower 136 may eliminate foreign substances on the sensor 131 accumulated due to the processing of the fabric 200 and the molded member 300. The air blower 136 may improve the accuracy of the sensor 131 by blowing air to remove or capture foreign substances.

The molded member 300 and the fabric 200 are placed on a fixation jig 130a of the processing system 130. The fixation jig 130a is positioned adjacent to the sensor 131, and serves to fix the molded member 300 and the fabric 200 in place so that the through-hole h may be accurately formed in the molded member 300 and the fabric 200.

The through-hole h may be formed in various shapes depending on the material of the fabric 200 and the molded member 300. The following description is made with reference to FIG. 7 and FIG. 8A to 8D.

FIG. 7 is a view illustrating through-holes formed in the fabric and the molded member using the processing system of the present disclosure, and FIG. 8A to FIG. 8D are views illustrating examples of through-holes formed in the fabric and the molded member using the processing system of the present disclosure.

Figure 8A:
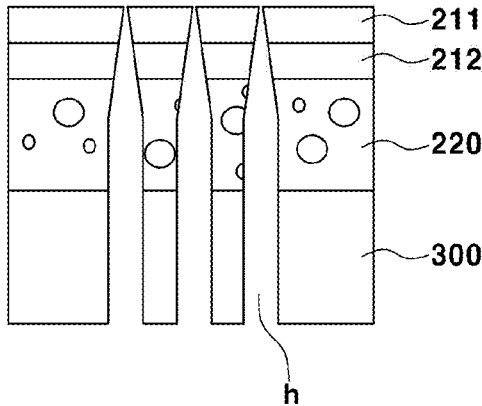
FIG. 8A to FIG. 8D are views illustrating examples of through-holes formed in the fabric and the molded member using the processing system.
Figure 8B:
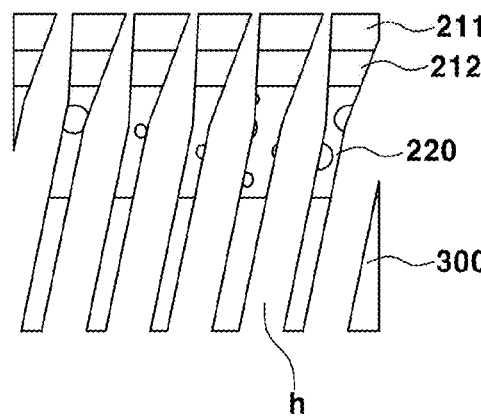
Figure 8C:
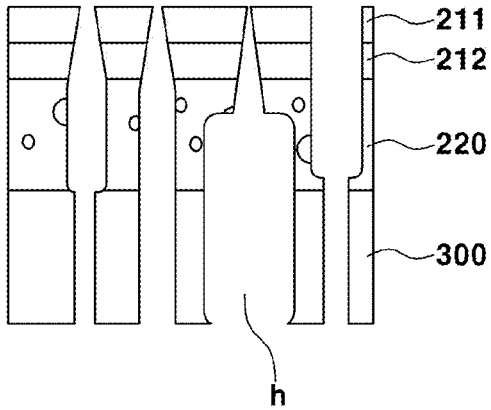
Figure 8D:
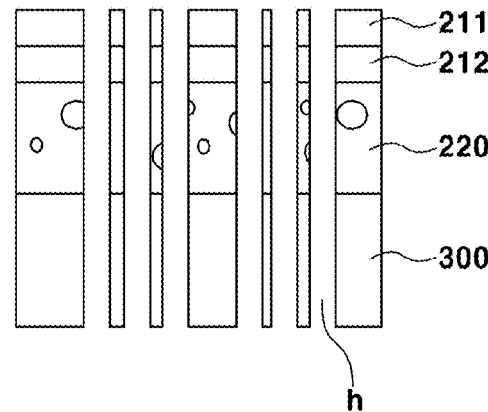

The processing angle, cross-section, and pitch of the through-holes may vary using the laser 133 of the processing system 130 of the present disclosure. For example, as illustrated in FIG. 7 and FIG. 8B, through-holes h at a predetermined angle may be formed by changing the processing angle. As illustrated in FIG. 8A and FIG. 8C, the cross-section of the through-holes h may vary, and the through-holes h may be processed to have various areas. As illustrated in FIG. 8D, the pitch of the through-holes h may vary.

As described above, by changing the irradiation intensity of the laser 133 of the processing system 130, the irradiation intensity of the laser 133 may be adjusted to suit the material of the molded member 300 and the fabric 200 to form through-holes h in various shapes. Moreover, even in the case of a layered fabric 200 in which different materials are bonded, the irradiation intensity of the laser 133 may be adjusted for each layer using the same equipment.

In some examples, the closer to the skin layer 210, the more appropriately the processing strength, speed, depth, and pitch of the through-holes may be made by considering the type and pattern of the fabric 200. As such, the processing strength, speed, depth, and pitch are adjusted according to the type of material, improving the external appearance and product quality of the crash pad 10.

In some examples, a robot arm may be used to irradiate the light of a laser 133 to a molded member 300 and a fabric 200. In some implementations, the reflector 134 and the spin lens 135 are used instead of the robot arm to implement the crash pad 10. Through the simple structure as described above, the process may be simplified and the manufacturing cost may also be reduced to realize the crash pad 10.

As is apparent from the above description, the present disclosure may obtain the following effects by the configuration, combination, and operation relationship described above.

According to the present disclosure, a fabric may be processed in various ways in a product molding state at a high speed using a low-power laser, simplifying the process and shortening cycle time (C/T), thereby reducing costs and securing deployment performance of a passenger air bag (PAB).

Moreover, according to the present disclosure, there may be provided a method of placing a jig-mounted light receiving sensor, configured to measure laser intensity, and a method of sensing, by the jig-mounted light receiving sensor, the laser intensity without using a robot arm.

The above detailed description is illustrative of the present disclosure. In addition, the above-described contents are to explain implementations of the present disclosure, and the present disclosure can be used in other various combinations, changes, and environments. That is, the present disclosure may be changed or modified within the scope of the concept of the disclosure disclosed in the present specification, an equivalent scope to the present disclosure, and/or the scope of technology or knowledge in the art. The implementations are illustrative of a best state for implementing a technical spirit of the present disclosure, and various modifications required in a detailed application field and purpose of the present disclosure are possible. Thus, the above detailed description of the present disclosure is not to be construed as limited to the specific implementations disclosed herein. Also, the appended claims should be construed as including other implementations.

It should be construed as including the other implementations.

What is claimed is:

1. A method for manufacturing a vehicle crash pad of an airbag, the method comprising:
   heating a skin layer using a heater;
   attaching a cushion layer to the skin layer to thereby form a fabric including the skin layer and the cushion layer disposed below the skin layer;

placing (i) a lower mold below the fabric and (ii) an upper mold above the fabric, at least one of the lower mold or the upper mold being configured to move up and down relative to the fabric;

providing a molded member on the lower mold, the molded member being disposed below the cushion layer;

performing a vacuum molding by moving the upper mold toward the lower mold, wherein the fabric and the molded member are disposed between the lower mold and the upper mold; and performing a laser processing with the fabric and the molded member that are coupled by the vacuum molding, wherein the laser processing comprises:

irradiating laser light to the fabric and the molded member to thereby define a through-hole through the fabric and the molded member, sensing, by a sensor, laser light passing through the through-hole, and adjusting an intensity of the laser light irradiated to the fabric and the molded member.

2. The method of claim 1, wherein the vehicle crash pad includes the skin layer, the cushion layer, and the molded member that are laminated in order.

3. The method of claim 1, wherein the sensor is a single laser light receiving sensor, or one of a plurality of laser light receiving sensors.

4. The method of claim 1, wherein the laser processing further comprises:

providing a spin lens that is configured to irradiate the laser light to the fabric and the molded member.

5. The method of claim 4, wherein the laser processing further comprises providing the laser light to the spin lens through a reflector, and wherein the laser light is irradiated to the fabric and the molded member through the spin lens.

6. The method of claim 1, wherein the laser processing further comprises generating the laser light by a $CO_2$ low-power laser apparatus.

7. The method of claim 1, wherein the skin layer comprises:

an inner skin layer located inside the vehicle crash pad; and an outer skin layer located outside the vehicle crash pad.

8. The method of claim 7, wherein the inner skin layer of the skin layer is made of any one material selected from thermoplastic olefin (TPO), polyurethane (PU), polyvinyl chloride (PVC), thermoplastic poly-urethane (TPU), poly-ethylene terephthalate (PET), knitted fabric, and nonwoven fabric, and wherein the outer skin layer is made of any one material selected from thermoplastic olefin (TPO), polyurethane (PU), polyvinyl chloride (PVC), thermoplastic poly-urethane (TPU), and polyethylene terephthalate (PET).

9. The method of claim 1, wherein the cushion layer is made of any one material selected from polypropylene (PP) foam, thermoplastic olefin (TPO) foam, polyurethane (PU) foam, knitted fabric, nonwoven fabric, and filament.

10. The method of claim 1, wherein the through-hole is a single through-hole or one of a plurality of through-holes, and passes through an entirety of the molded member and the fabric that are coupled, wherein a diameter of a first portion of the through-hole through the fabric is Φ0.1 mm-Φ1.0 mm, and wherein a diameter of a second portion of the through-hole through the molded member is Φ0.6 mm-Φ1.6 mm.

11. The method of claim 1, wherein the laser processing further comprises:

sensing a thickness of the fabric and the molded member that are coupled;

transmitting sensed data to a controller; and adjusting, by the controller, (i) the intensity of the laser light, (ii) a duration of irradiation of the laser light, and (iii) an angle of a spin lens through which the laser light is irradiated.

12. The method of claim 1, wherein the laser processing further comprises:

holding the molded member and the fabric by a fixation jig, the fixation jig being positioned adjacent to the sensor and configured to fix the molded member and the fabric to thereby define a position of the through-hole in the molded member and the fabric.

13. The method of claim 1, wherein the laser processing further comprises blowing air by an air blower toward the sensor.

14. The method of claim 1, wherein the laser processing further comprises moving the sensor up and down during the laser processing along a center line of the sensor.

* * * * *